United States Patent
Li et al.

(10) Patent No.: US 12,266,049 B2
(45) Date of Patent: Apr. 1, 2025

(54) METHOD AND APPARATUS FOR PROCESSING IMMERSIVE MEDIA DATA, STORAGE MEDIUM AND ELECTRONIC APPARATUS

(71) Applicant: ZTE Corporation, Shenzhen (CN)

(72) Inventors: Qiuting Li, Shenzhen (CN); Cheng Huang, Shenzhen (CN); Yaxian Bai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 152 days.

(21) Appl. No.: 17/922,086

(22) PCT Filed: Jun. 7, 2021

(86) PCT No.: PCT/CN2021/098689
§ 371 (c)(1),
(2) Date: Oct. 28, 2022

(87) PCT Pub. No.: WO2021/259054
PCT Pub. Date: Dec. 30, 2021

(65) Prior Publication Data
US 2023/0169719 A1 Jun. 1, 2023

(30) Foreign Application Priority Data
Jun. 23, 2020 (CN) .......................... 202010581346.0

(51) Int. Cl.
*G06T 15/20* (2011.01)
*G06F 3/01* (2006.01)
*G06T 19/20* (2011.01)

(52) U.S. Cl.
CPC .............. *G06T 15/20* (2013.01); *G06F 3/011* (2013.01); *G06T 19/20* (2013.01); *G06T 2219/2016* (2013.01)

(58) Field of Classification Search
CPC ..................... G06T 15/20; G06T 19/20; G06T 2219/2016; G06T 15/005; G06F 3/011;
(Continued)

(56) References Cited

U.S. PATENT DOCUMENTS

2018/0020204 A1* 1/2018 Pang ...................... H04N 23/90
2019/0394444 A1* 12/2019 Oh .......................... H04L 65/65
(Continued)

FOREIGN PATENT DOCUMENTS

| CN | 108319362 A | 7/2018 |
| CN | 110494915 A | 11/2019 |

(Continued)

OTHER PUBLICATIONS

International Search Report for corresponding application PCT/CN2021/098689 filed Jun. 7, 2021; Mail date Jul. 28, 2021.
(Continued)

*Primary Examiner* — Ryan M Gray
(74) *Attorney, Agent, or Firm* — CANTOR COLBURN LLP

(57) ABSTRACT

Provided are a method and apparatus for processing immersive media data, a storage medium, and an electronic apparatus. The method comprises: acquiring immersive media data corresponding to a current viewing posture of a user, wherein a three-dimensional viewing space is used to limit viewing content of the user; and rendering the immersive media data corresponding to the current viewing posture, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space.

18 Claims, 5 Drawing Sheets

(58) Field of Classification Search
CPC .............. G06F 3/012; H04N 21/21805; H04N 21/816; H04N 21/85406; H04N 13/106; H04N 13/122; H04N 13/117; H04N 13/178; H04N 13/366
See application file for complete search history.

(56) References Cited

U.S. PATENT DOCUMENTS

2020/0145736 A1    5/2020  Di et al.
2020/0169754 A1*   5/2020  Wang .................. H04N 13/122
2021/0321083 A1*  10/2021  Malamal Vadakital .. G06T 7/70

FOREIGN PATENT DOCUMENTS

| CN | 110876051 | A |   | 3/2020 |              |
|----|-----------|---|---|--------|--------------|
| CN | 110944222 | A |   | 3/2020 |              |
| CN | 113453083 | A | * | 3/2020 | ......... H04N 21/4402 |
| CN | 111213183 | A |   | 5/2020 |              |
| CN | 112492289 | A |   | 3/2021 |              |
| EP | 3668092   | A1|   | 6/2020 |              |

OTHER PUBLICATIONS

European Search Report for corresponding application EP21830152; Report dated Oct. 20, 2023.

* cited by examiner

METHOD AND APPARATUS FOR PROCESSING IMMERSIVE MEDIA DATA, STORAGE MEDIUM AND ELECTRONIC APPARATUS

CROSS-REFERENCE TO RELATED APPLICATION

The present disclosure claims priority to Chinese Patent Application No. CN202010581346.0, filed on Jun. 23, 2020, and entitled "method and apparatus for processing immersive media data, storage medium and electronic apparatus", the disclosure of which is hereby incorporated by reference in its entirety.

TECHNICAL FIELD

Embodiments of the present disclosure relate to the field of communications, and in particular, to a method and apparatus for processing immersive media data, a storage medium, and an electronic apparatus.

BACKGROUND

By technologies such as audio and video, immersive media allows for a user to experience a highly-realistic virtual space environment in aspects such as vision and hearing, thereby producing an immersive feeling. Currently, an immersive experience mainly supports planar panoramic videos. For example, a user wearing a head-mounted display device can view a video in 360 degrees through free rotation of the head thereof, i.e. a 3 degree of freedom (3DOF for short) immersive experience. For videos supporting enhanced 3 degree of freedom (3DOF+) and 6 degree of freedom (6DOF), the user can perform body translation and head rotation during viewing according to their own requirements to view more details, such as a part of visual content shielded.

After the user performs body movement or head rotation, window content viewed by the user changes, and the display device needs to select suitable video data from media data according to the viewing posture (body position, head orientation) of the user, for reconstruction and rendering, so as to present visual content in the current window range to the user, thereby satisfying the sense of immersion of the user. A range in which the user can move in a space is directly related to attributes such as the position and direction of a video data collection device. When the user moves beyond a certain range, the display device cannot reconstruct visual content in the current window according to collected video data, such that gradual fade-out, twisting and no sense of immersion, etc. will occur in the visual content viewed by the user. In order to ensure the continuity of viewing and the quality of viewing of the user, it is necessary to define a three-dimensional viewing space of the user. If the user is within the three-dimensional viewing space, the user can experience immersive media normally by rendering of video data; and if the user is beyond the three-dimensional viewing space, the user can continue viewing and resuming sense of immersion after processing such as reconstruction and rendering on the video data, or fade-out occurs in the video data without further processing, etc.

Currently, an immersive media system defines the range of a three-dimensional viewing space of a user on the basis of a single viewpoint, and a range in which the user can move is very limited, wherein a geometric structure indicates the three-dimensional viewing space is simple, such as a cube, a circle, or a cylinder. The size and shape of a three-dimensional viewing space are necessarily related to the positions and number of collection devices, etc., and thus how to accurately describe the three-dimensional viewing space of a user will affect the rendering and presentation of visual content viewed by the user.

With regard to the described problems, the present disclosure provides a method and apparatus for processing immersive media data, a storage medium and an electronic apparatus, which are suitable for defining a range of viewing positions when viewing immersive media based on multi-viewpoint data or point cloud data, and facilitate quick, efficient and high-quality reconstruction and rendering of visual content during viewing, so as to satisfy the optimal immersive experience.

SUMMARY

Embodiments of the present disclosure provide a method and apparatus for processing immersive media data, a storage medium, and an electronic apparatus, so as to at least solve the problem in the related art that the rendering and presentation of visual content viewed by a user are affected.

According to some embodiments of the present disclosure, a method for processing immersive media data is provided, including: immersive media data corresponding to a current viewing posture of a user is acquired, wherein a three-dimensional viewing space is used to limit viewing content of the user; and the immersive media data corresponding to the current viewing posture is rendered, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space.

In an embodiment, the step that immersive media data corresponding to a current viewing posture of a user is acquired includes: a relationship between the current viewing posture and the three-dimensional viewing space is determined, wherein the three-dimensional viewing space is a range allowing the user to move in an immersive media scene; and the immersive media data is determined according to the relationship.

In an embodiment, the step that a relationship between the current viewing posture and the three-dimensional viewing space is determined includes: a position of the current viewing posture in the three-dimensional viewing space or outside the three-dimensional viewing space is determined; and the immersive media data is determined according to the position.

In an embodiment, before the immersive media data corresponding to the current viewing posture is rendered, the method includes: a media track or a data box, which describes the handling information of the three-dimensional viewing space, in a media file is determined according to a data box type or a timed metadata track sample entry type.

In an embodiment, the step that a media track or a data box, which describes the three-dimensional viewing space, in a media file is determined according to a data box type or a timed metadata track sample entry type includes one of the following methods: a first three-dimensional viewing space data box in a file header of the media file is identified according to a first data box type; or a second three-dimensional viewing space grouping data box in the file header of the media file is identified according to a second grouping type; or a third three-dimensional viewing space data box in one or more media tracks of the media file is identified according to a third data box type; or a fourth three-dimensional viewing space sample group description data box in one media track of the media file is identified according to a fourth sample grouping type; or a fifth three-dimensional viewing space data box in one media track of the media file is identified according to a fifth track group type, wherein one or more media tracks having the same track group identifier belong to the same three-dimensional viewing space; or a three-dimensional viewing space timed metadata track in the media file is identified according to a sixth sample entry type, wherein the three-dimensional viewing space timed metadata track indicates a dynamically-changing three-dimensional viewing space of the immersive media data.

In an embodiment, information of the three-dimensional viewing space includes at least one of: coordinate positions of the three-dimensional viewing space in a space scene of immersive media, an orientation of the three-dimensional viewing space in the space scene of the immersive media, a geometric structure of the three-dimensional viewing space, and a viewing direction in the three-dimensional viewing space, wherein the structure of the three-dimensional viewing space is constructed by combining one or more complex geometric structures, each of the complex geometric structures is constructed by combining one or more basic structures; and each of the basic structures corresponds to a collection device or a collected view of zero or one piece of the immersive media data.

In an embodiment, before the immersive media data corresponding to the current viewing posture is rendered, the method includes: a media track or a data box, which describes the handling information of the three-dimensional viewing space, in a media file is determined according to a data box type or a timed metadata track sample entry type.

In an embodiment, the step that a media track or a data box, which describes the handling information of the three-dimensional viewing space, in a media file is determined according to a data box type or a timed metadata track sample entry type includes: a three-dimensional viewing space handling data box is identified by a seventh data box type, wherein the three-dimensional viewing space handling data box is included in the data box describing the three-dimensional viewing space, or is located in the same higher-level data box as the data box describing the three-dimensional viewing space; or the three-dimensional viewing space handling data box is included in a timed metadata track of the three-dimensional viewing space; or a three-dimensional viewing space handling timed metadata track in the media file is identified according to an eighth sample entry type, wherein the three-dimensional viewing space handling timed metadata track indicates a handling method of a dynamically-changing three-dimensional viewing space in the three-dimensional viewing space.

In an embodiment, the handling information of the three-dimensional viewing space includes at least one of: the number of options of handling methods of the three-dimensional viewing space, the type of devices for handling the three-dimensional viewing space, the type of applications for handling the three-dimensional viewing space, handling methods of the three-dimensional viewing space and an identifier of the three-dimensional viewing space.

In an embodiment, the step that immersive media data corresponding to a current viewing posture of a user is acquired includes: in cases where it is determined that the current viewing posture of the user is within the three-dimensional viewing space, the immersive media data is directly acquired; or in cases where it is determined that the current viewing posture of the user is moving or has moved outside the three-dimensional viewing space, the immersive media data corresponding to the current viewing posture is acquired according to the handling information of the three-dimensional viewing space.

In an embodiment, the step that the immersive media data is acquired includes: a media presentation description file is determined, wherein the media presentation description file includes a three-dimensional viewing space descriptor and/or a three-dimensional viewing space handling descriptor which indicate viewing of the immersive media; and according to the three-dimensional viewing space descriptor and/or the three-dimensional viewing space handling descriptor which correspond to the current viewing posture of the user, the immersive media data corresponding to the current viewing posture is requested to be acquired.

In an embodiment, the three-dimensional viewing space descriptor of the immersive media includes at least one of: the structure of a basic geometry, a rotation direction of the basic geometry, a view corresponding to the basic geometry or an identifier or index of a collection device, rotation of the basic geometry, a viewing direction in the basic geometry, a combination manner of basic geometries, a combination manner of complex geometries, and an identifier of the three-dimensional viewing space.

In an embodiment, the three-dimensional viewing space handling descriptor of the immersive media includes at least one of: the type of devices for handling the three-dimensional viewing space, the type of applications for handling the three-dimensional viewing space, handling methods of the three-dimensional viewing space and an identifier of the three-dimensional viewing space.

According to an embodiment of the present disclosure, an apparatus for processing immersive media data is provided, including: an acquisition unit, configured to acquire immersive media data corresponding to a current viewing posture of a user, wherein a three-dimensional viewing space is used to limit viewing content of the user; and a rendering unit, configured to render the immersive media data corresponding to the current viewing posture, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space.

In an embodiment, the acquisition unit includes: a first determination module, configured to determine a relationship between the current viewing posture and the three-dimensional viewing space, wherein the three-dimensional viewing space is a range allowing the user to move in an immersive media scene; and a second determination module, configured to determine the immersive media data according to the relationship.

In an embodiment, the first determination module includes: a first determination sub-module, configured to determine a position of the current viewing posture in the three-dimensional viewing space or outside the three-dimensional viewing space; and a second determination sub-module, configured to determine the immersive media data according to the position.

In an embodiment, the apparatus further includes: a first determination unit, configured to before the immersive media data corresponding to the current viewing posture is rendered, determine a media track or a data box, which describes the handling information of the three-dimensional viewing space, in a media file according to a data box type or a timed metadata track sample entry type.

In an embodiment, the first determination unit is further configured to execute one of: a first three-dimensional viewing space data box in a file header of the media file is identified according to a first data box type; or a second three-dimensional viewing space grouping data box in the file header of the media file is identified according to a second grouping type; or a third three-dimensional viewing space data box in one or more media tracks of the media file is identified according to a third data box type; or a fourth three-dimensional viewing space sample group description data box in one media track of the media file is identified according to a fourth sample grouping type; or a fifth three-dimensional viewing space data box in one media track of the media file is identified according to a fifth track group type, wherein one or more media tracks having the same track group identifier belong to the same three-dimensional viewing space; or a three-dimensional viewing space timed metadata track in the media file is identified according to a sixth sample entry type, wherein the three-dimensional viewing space timed metadata track indicates a dynamically-changing three-dimensional viewing space of the immersive media data.

In an embodiment, information of the three-dimensional viewing space includes at least one of: coordinate positions of the three-dimensional viewing space in a space scene of immersive media, an orientation of the three-dimensional viewing space in the space scene of the immersive media, a geometric structure of the three-dimensional viewing space, and a viewing direction in the three-dimensional viewing space, wherein the structure of the three-dimensional viewing space is constructed by combining one or more complex geometric structures, and each of the complex geometric structures is constructed by combining one or more basic structures; and each of the basic structures corresponds to a collection device or a collected view of zero or one piece of the immersive media data.

In an embodiment, the apparatus further includes: a second determination unit, configured to before the immersive media data corresponding to the current viewing posture is rendered, determine a media track or a data box, which describes the handling information of the three-dimensional viewing space, in a media file according to a data box type or a timed metadata track sample entry type.

In an embodiment, the second determination unit includes: an identification module, configured to identify a three-dimensional viewing space handling data box by a seventh data box type, wherein the three-dimensional viewing space handling data box is included in the data box describing the three-dimensional viewing space, or is located in the same higher-level data box as the data box describing the three-dimensional viewing space; or the three-dimensional viewing space handling data box is included in the three-dimensional viewing space timed metadata track; or the three-dimensional viewing space handling timed metadata track in the media file is identified according to an eighth sample entry type, wherein the three-dimensional viewing space handling timed metadata track indicates a handling method of a dynamically-changing three-dimensional viewing space in the three-dimensional viewing space.

In an embodiment, the handling information of the three-dimensional viewing space includes at least one of: the number of options of handling methods of the three-dimensional viewing space, the type of devices for handling the three-dimensional viewing space, the type of applications for handling the three-dimensional viewing space, handling methods of the three-dimensional viewing space and an identifier of the three-dimensional viewing space.

In an embodiment, the acquisition unit includes: a first acquisition module, configured to directly acquire the immersive media data in cases where it is determined that the current viewing posture of the user is within the three-dimensional viewing space; or a second acquisition module, configured to acquire the immersive media data corresponding to the current viewing posture according to the handling information of the three-dimensional viewing space in cases where it is determined that the current viewing posture of the user is moving or has moved outside the three-dimensional viewing space.

In an embodiment, the first acquisition module or the second acquisition module is further configured to: determine a media presentation description file, wherein the media presentation description file includes a three-dimensional viewing space descriptor and/or a three-dimensional viewing space handling descriptor which indicate viewing of the immersive media; and request to acquire the immersive media data corresponding to the current viewing posture according to the three-dimensional viewing space descriptor and/or the three-dimensional viewing space handling descriptor which correspond to the current viewing posture of the user.

In an embodiment, the three-dimensional viewing space descriptor of the immersive media includes at least one of: the structure of a basic geometry, a rotation direction of the basic geometry, a view corresponding to the basic geometry or an identifier or index of a collection device, rotation of the basic geometry, a viewing direction in the basic geometry, a combination manner of basic geometries, a combination manner of complex geometries, and an identifier of the three-dimensional viewing space.

In an embodiment, the three-dimensional viewing space handling descriptor of the immersive media includes at least one of: the type of devices for handling the three-dimensional viewing space, the type of applications for handling the three-dimensional viewing space, handling methods of the three-dimensional viewing space and an identifier of the three-dimensional viewing space.

According to still an embodiment of the present disclosure, a computer-readable storage medium is further provided, the computer-readable storage medium stores a computer program, wherein the computer program is configured to execute the steps in any one of the method embodiments when running.

According to still an embodiment of the present disclosure, an electronic apparatus is further provided, wherein the electronic apparatus includes a memory and a processor, the memory stores a computer program, and the processor is configured to run the computer program so as to execute the steps in any one of the method embodiments.

In the embodiments of the present disclosure, by means of a method in which immersive media data corresponding to a current viewing posture of a user is acquired, wherein a three-dimensional viewing space is used to limit viewing content of the user; and the immersive media data corresponding to the current viewing posture is rendered, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space, when the user moves outside the three-dimensional viewing space, the immersive media data can be rendered according to the handling information of the three-dimensional viewing space, so that even if the user moves outside the three-dimensional viewing space, high-quality visual content can still be quickly and efficiently provided to the user, and thus the problem of the rendering and presentation of visual content viewed by a user being affected can be solved, thereby achieving quick, efficient and high-quality reconstruction and rendering of visual content during viewing, so as to satisfy the optimal immersive experience effect.

DETAILED DESCRIPTION OF THE EMBODIMENTS

Hereinafter, embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or order.

Figure 1:
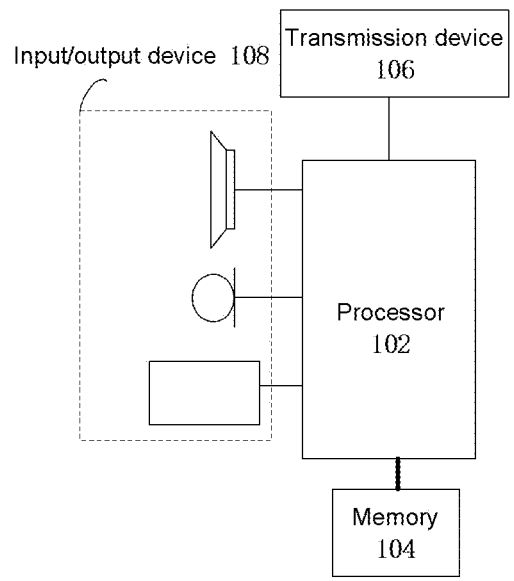
FIG. 1 is a schematic structural diagram of an apparatus for executing a method for processing immersive media data according to some embodiments of the present disclosure.

The method embodiments provided in the embodiments of the present disclosure can be executed in a mobile terminal, a computer terminal or a similar computing apparatus. Taking the method embodiments being executed on a mobile terminal as an example, FIG. 1 is a structural block diagram of hardware of a mobile terminal for a method for processing immersive media data according to some embodiments of the present disclosure. As shown in FIG. 1, the mobile terminal can include one or more processors 102 (only one processor is shown in FIG. 1 (the processor 102 may include but is not limited to a Microprocessor Unit (MPU) or a Programmable logic device (PLD)), and a memory 104 configured to store data, wherein the mobile terminal can further include a transmission device 106 and an input/output device 108 which are configured to have communication functions. A person of ordinary skill in the art would understand that the structure shown in FIG. 1 is merely exemplary, and does not limit the structure of the mobile terminal. For example, the mobile terminal may also include more or fewer components than those shown in FIG. 1, or have different configurations from that shown in FIG. 1.

The memory 104 may be configured to store a computer program, for example, a software program and module of application software, such as a computer program corresponding to the method for processing immersive media data in the embodiments of the present disclosure; and the processor 102 runs the computer program stored in the memory 104 to execute various functional applications and data processing, i.e., to implement the described method. The memory 104 may include a high-speed random access memory, and may also include a non-transitory memory, such as one or more magnetic storage apparatuses, flash memories, or other non-transitory solid-state memories. In some examples, the memory 104 may further include memories remotely arranged with respect to the processor 102, and these remote memories may be connected to the mobile terminal via a network. Examples of the described network include, but are not limited to the Internet, an intranet, a local area network, a mobile communication network, and a combination thereof.

The transmission device 106 is configured to receive or send data via a network. Specific examples of the network may include a wireless network provided by a communication provider of a mobile terminal. In an example, the transmission device 106 includes a network interface controller (NIC for short) which may be connected to other network devices by means of a base station, thereby being able to communicate with the Internet. In one example, the transmission device 106 may be a radio frequency (RF for short) module which is configured to communicate with the Internet in a wireless manner.

Figure 2:
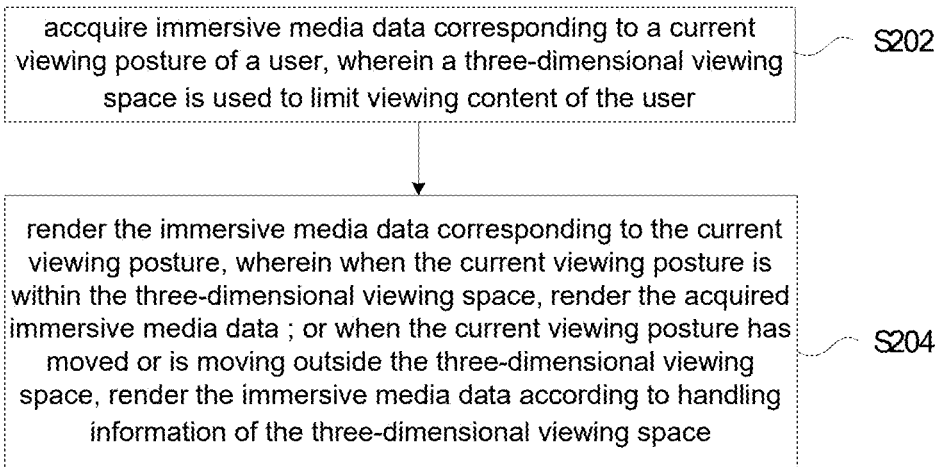
FIG. 2 is a schematic diagram of a flowchart of a method for processing immersive media data according to some embodiments of the present disclosure.

The present embodiment provides a method for processing immersive media data. FIG. 2 is a flowchart of a method for processing immersive media data according to some embodiments of the present disclosure. As shown in FIG. 2, the flow includes the following steps:

step S202: immersive media data corresponding to a current viewing posture of a user is acquired, wherein a three-dimensional viewing space is used to limit viewing content of the user; and step S204: the immersive media data corresponding to the current viewing posture is rendered, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space.

It should be noted that the three-dimensional viewing space in the present disclosure is a space that allows a user to move. Generally speaking, a virtual camera is provided in a three-dimensional viewing space, and the virtual camera can photograph content in the three-dimensional viewing space and feed the content back to a user in a real space. If the user moves or rotates in the real space, the virtual camera moves or rotates in the three-dimensional viewing space. The three-dimensional viewing space is a range in which the system suggests the user, i.e., the virtual camera, to move. The user or the virtual camera may also move outside the three-dimensional viewing space, and does not necessarily move within the three-dimensional viewing space. Limiting the rendering of viewing content of a user by using a three-dimensional viewing space means that after the virtual camera captures content in the three-dimensional viewing space, the content is transferred to the user for viewing, and in this case, the content captured by the virtual camera needs to be rendered. That is to say, content viewed by the user is rendered.

The step that immersive media data corresponding to a current viewing posture of a user is acquired includes: a relationship between the current viewing posture and the three-dimensional viewing space is determined, wherein the three-dimensional viewing space is a virtual space range that allows the user to move; and the immersive media data is determined according to the relationship.

The step that a relationship between the current viewing posture and the three-dimensional viewing space is determined includes: a position of the current viewing posture in the three-dimensional viewing space or outside the three-dimensional viewing space is determined; and a three-dimensional viewing space of the immersive media data is determined according to the position.

Before the immersive media data corresponding to the current viewing posture is rendered, the method includes: a media track or a data box, which describes the handling information of the three-dimensional viewing space, in a media file is determined according to a data box type or a timed metadata track sample entry type.

The step that a media track or a data box, which describes the three-dimensional viewing space, in a media file is determined according to a data box type or a timed metadata track sample entry type includes one of the following methods: a first three-dimensional viewing space data box in a file header of the media file is identified according to a first data box type; or a second three-dimensional viewing space grouping data box in the file header of the media file is identified according to a second grouping type; or a third three-dimensional viewing space data box in one or more media tracks of the media file is identified according to a third data box type; or a fourth three-dimensional viewing space sample group description data box in one media track of the media file is identified according to a fourth sample grouping type; or a fifth three-dimensional viewing space data box in one media track of the media file is identified according to a fifth track group type, wherein one or more media tracks having the same track group identifier belong to the same three-dimensional viewing space; or a three-dimensional viewing space timed metadata track in the media file is identified according to a sixth sample entry type, wherein the three-dimensional viewing space timed metadata track indicates a dynamically-changing three-dimensional viewing space of the immersive media data.

The handling information of the three-dimensional viewing space includes at least one of: coordinate positions of the three-dimensional viewing space in a space scene of immersive media, an orientation of the three-dimensional viewing space in the space scene of the immersive media, a geometric structure of the three-dimensional viewing space, and a viewing direction in the three-dimensional viewing space, wherein the structure of the three-dimensional viewing space is constructed by combining one or more complex geometric structures, each of the complex geometric structures is constructed by combining one or more basic structures; and each of the basic structures corresponds to a collection device or a collected view of zero or one piece of the immersive media data.

Before the immersive media data corresponding to the current viewing posture is rendered, the method includes: a media track or a data box, which describes the handling information of the three-dimensional viewing space, in a media file is determined according to a data box type or a timed metadata track sample entry type.

The step that a media track or a data box, which describes the handling information of the three-dimensional viewing space, in a media file is determined according to a data box type or a timed metadata track sample entry type includes: a three-dimensional viewing space handling data box is identified by a seventh data box type, wherein the three-dimensional viewing space handling data box is included in the data box describing the three-dimensional viewing space, or is located in the same higher-level data box as the data box describing the three-dimensional viewing space; or the three-dimensional viewing space handling data box is included in the three-dimensional viewing space timed metadata track; or the three-dimensional viewing space handling timed metadata track in the media file is identified according to an eighth sample entry type, wherein the three-dimensional viewing space handling timed metadata track indicates a handling method of a dynamically-changing three-dimensional viewing space in the three-dimensional viewing space.

The handling information of the three-dimensional viewing space includes at least one of: the number of options of handling methods of the three-dimensional viewing space, the type of devices for handling the three-dimensional viewing space, the type of applications for handling the three-dimensional viewing space, handling methods of the three-dimensional viewing space and an identifier of the three-dimensional viewing space.

The step that immersive media data corresponding to a current viewing posture of a user is acquired includes: in cases where it is determined that the current viewing posture of the user is within the three-dimensional viewing space, the immersive media data is directly acquired; or in cases where it is determined that the current viewing posture of the user is moving or has moved outside the three-dimensional viewing space, the immersive media data corresponding to the current viewing posture is acquired according to the handling information of the three-dimensional viewing space.

The step that the immersive media data is acquired includes: a media presentation description file is determined, wherein the media presentation description file includes a three-dimensional viewing space descriptor and/or a three-dimensional viewing space handling descriptor which indicate viewing of the immersive media; and according to the three-dimensional viewing space descriptor and/or the three-dimensional viewing space handling descriptor which correspond to the current viewing posture of the user, the immersive media data corresponding to the current viewing posture is requested to be acquired.

The three-dimensional viewing space descriptor of the immersive media includes at least one of: the structure of a basic geometry, a rotation direction of the basic geometry, a view corresponding to the basic geometry or an identifier or index of a collection device, rotation of the basic geometry, a viewing direction in the basic geometry, a combination manner of basic geometries, a combination manner of complex geometries, and an identifier of the three-dimensional viewing space.

The three-dimensional viewing space handling descriptor of the immersive media includes at least one of: the type of devices for handling the three-dimensional viewing space, the type of applications for handling the three-dimensional viewing space, handling methods of the three-dimensional viewing space and an identifier of the three-dimensional viewing space. The described steps solve the problem that the rendering and presentation of visual content viewed by a user are affected, thereby achieving quick, efficient and high-quality reconstruction and rendering of visual content during viewing, so as to satisfy the optimal immersive experience effect.

The present disclosure can be applied in an immersive experience process. A user views a scene in a three-dimensional viewing space by wearing a display device. The user can move in a real space, so as to be mapped to a virtual role of the user moving in a three-dimensional viewing space, and immersive media data captured by the corresponding virtual role is played back in the display device. In this process, if the current viewing posture of the user in the three-dimensional viewing space exceeds the three-dimensional viewing space, the immersive media data is rendered according to the handling information of the three-dimensional viewing space.

The three-dimensional viewing space refers to a range in which a virtual role of the user can move in an immersive media scene. A three-dimensional viewing posture refers to the position and viewing direction (the orientation of the virtual camera) of the virtual role corresponding to the user in the three-dimensional viewing space. If the virtual role is beyond the range of the three-dimensional viewing space, problems such as a black screen may occur in the related art. In the present disclosure, if the virtual role of the user is beyond the range of the three-dimensional viewing space, the immersive media data can be rendered according to the handling information of the three-dimensional viewing space, thereby achieving the effect of quick, efficient and high-quality reconstruction and rendering of visual content in a viewing process, and solving the problem of blank screen.

Hereinafter, how to construct a three-dimensional viewing space and how to acquire immersive media data, etc. are described in combination with specific examples.

Figure 3:
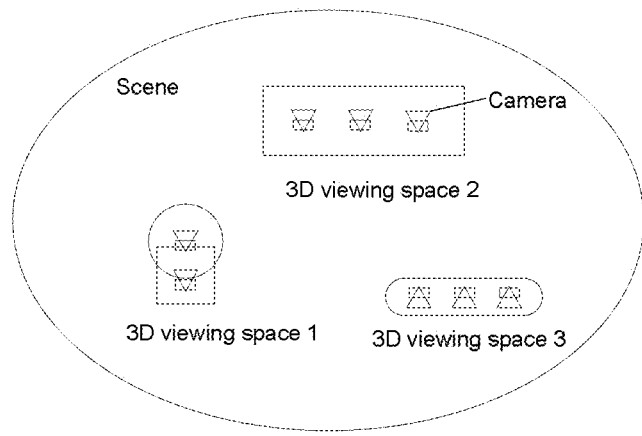
FIG. 3 is a schematic diagram of three-dimensional viewing spaces in a method for processing immersive media data according to some embodiments of the present disclosure.

FIG. 3 is a schematic diagram of optional structural positions of three-dimensional viewing spaces. In an exemplary scene, immersive video collection devices (cameras) are placed at different positions to collect video data in the scene, and based on the positions of the collection devices, one or more three-dimensional viewing spaces can be formed. The three-dimensional viewing space may be a basic geometry represented by a single cube, a sphere, a cylinder, or the like, or may be a complex geometry formed by combination of multiple basic geometries. When a user moves in the three-dimensional viewing space, a display device can acquire media data corresponding to a user window, perform reconstruction and rendering on images in the window, and perform rapid switching on content presentation in the user window; and when the user moves outside the range of the three-dimensional viewing space, because there is no media data collected by corresponding devices, the display device cannot display corresponding visual content in the user window, or can only display low-quality visual content. The three-dimensional viewing spaces 1-3 in FIG. 3 relate to different situations.

Moreover, in the three-dimensional viewing space, the viewing direction of the user may also be limited by the position and orientation of a collection device.

Figure 4:
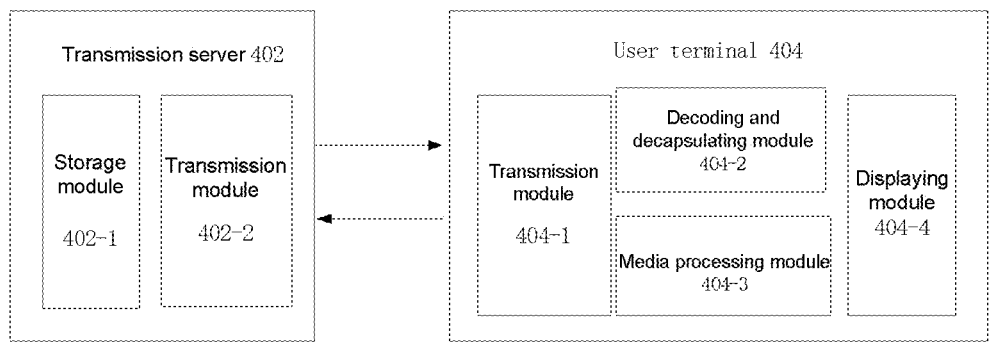
FIG. 4 is a system structural schematic diagram of a method for processing immersive media data according to some embodiments of the present disclosure.

FIG. 4 is an optional schematic structural diagram of a system for processing immersive media data.

As shown in FIG. 4, the system includes a transmission server 402 and a user terminal 404. The transmission server 402 at least includes a storage module 402-1 and a transmission module 402-2.

The storage module 402-1 is configured to store a media file produced by a production server 10.

The transmission module 402-2 is configured to receive a request message from the user terminal or send the stored media file. The receiving or sending may be implemented by a wireless network provided by a communication provider, a locally-constructed wireless local area network, or in a wired manner.

The user terminal 404 at least includes a transmission module 404-1, a decoding and decapsulating module 404-2, a media processing module 404-3, and a displaying module 404-4.

The transmission module 404-1 is configured to receive a media file sent by the transmission server 402, or send a request message to the transmission server 402, for example, requesting to download the media file;

the decoding and decapsulating module 404-2 is configured to decode and decapsulate the media file received by the transmission module;

the media processing module 404-3 performs processing such as reconstruction and rendering on media data outputted by the decoding and decapsulating module 404-2 according to information such as the current viewing position and viewing direction of the user; and the displaying module 404-4 is configured to present visual content of a current user window to the user.

Figure 5:
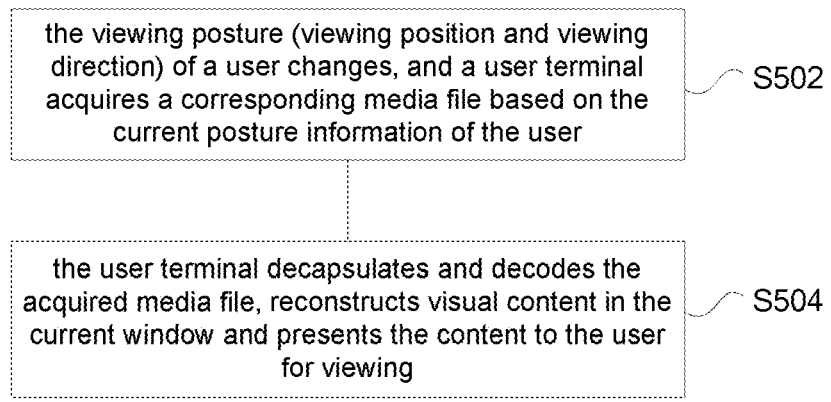
FIG. 5 is a flowchart of a method of processing immersive media data according to some embodiments of the present disclosure.

The present embodiment provides a processing/playback flow of a media system based on a three-dimensional viewing space, and representation of a file format. As shown in FIG. 5, the flow includes the following steps:

step S502, the viewing posture (viewing position and viewing direction) of a user changes, and a user terminal acquires a corresponding media file based on a three-dimensional viewing space range to which the current posture information of the user belongs, wherein the media file includes immersive media data; and step S504, the user terminal decapsulates and decodes the acquired media file, reconstructs visual content in the current window according to information such as the current viewing position and viewing direction of the user, renders the visual content and then presents the content to the user for viewing.

It should be noted that in the embodiments of the present disclosure, one implementation is to store omnidirectional video data in a file based on an ISO (International Organization for Standardization) base media file format. ISO base media file formats such as a restricted solution information box, a track reference box, and a track group box may be operated with reference to Moving Picture Experts Group (MPEG for short)-4 Part 12 ISO Base Media File Format formulated by ISO/IEC JTC1/SC29/WG11 MPEG. Projection and encapsulation steps of the omnidirectional video and the base format thereof can be operated with reference to MPEG-1 Part 2 OMAF (omnidirectional media format) formulated by ISO/IEC JTC1/SC29/WG11 Moving Picture Experts Group (MPEG).

In addition, all data in the ISO base file format is packed in a box, that is, the ISO base file format represented by an MP4 file is composed of several boxes, wherein each box has a type and a length, and can be considered as a data object. One box may contain another box, and is referred to as a container box. An MP4 file first has one and has only one "ftyp"-type box which serves as a flag of the file format and includes some information about the file. Then, there will be one and only one "MOOV"-type Box (Movie Box), which is a container box whose sub-box contains metadata information of the media. Media data of the MP4 file is included in an "mdat"-type box (Media Data Box) which is also a container box and the number of which may be multiple and may also be none (when all media data refers to other files). The structure of the media data is described by metadata. In order to further support the metadata description of the media, optionally, a "meta"-type box (Meta box) is used, which is also a container box and is used for describing some general or additional non-timed metadata. A piece of media may be composed of one or more tracks, each track is a media sequence changing over time, and a track includes a set of continuous samples.

Moreover, a timed metadata track is a mechanism of timed metadata establishing association with a specific sample in the ISO Base Media File Format (ISOBMFF for short). Timed metadata is less coupled to media data, and is often "descriptive".

Specifically, a data box or sample entry is defined in the media file to describe a three-dimensional viewing space of a scene. Constant, infrequently-changing or frequently-changing three-dimensional viewing spaces can be included in different levels, different media tracks or different containers, and the three-dimensional viewing spaces may be described at a file level or a media track level. Moreover, one or more independent geometries exist in one scene to represent a three-dimensional viewing space.

Figure 6:
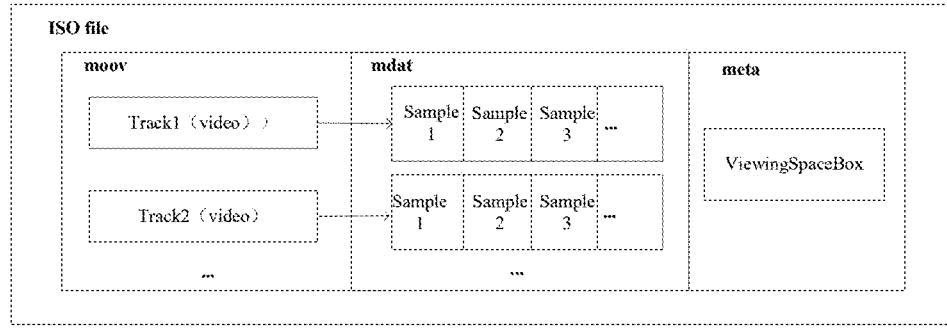
FIG. 6 is a schematic diagram of an IOS file in a method for processing immersive media data according to some embodiments of the present disclosure.

Alternatively, the specific description manner of the three-dimensional viewing space may adopt one of the following manners:

Manner 1: The three-dimensional viewing space is described at a file level, and it is defined that a three-dimensional viewing space data box (ViewingSpaceBox) is included in Metabox of the file level (as shown in FIG. 6). Hereinafter, illustration is made in combination with an example of the three-dimensional viewing space data box.

ViewingSpaceBox (Three-dimensional viewing space data box)
Box Type: 'vwsp'
Container: MetaBox
Mandatory: No
Quantity: Zero or one
Syntax

```
aligned(8) class ViewingSpaceBox extends FullBox('vwsp', 0, flags) {
signed int(8) num_viewing_space;    //optionally, if there is only one viewing space in one media track or a media track group, it may not be applicable. for(int j=0;j<=num_viewing_space;j++) {
    unsigned int( 16) viewing_space_id[j];
ViewingSpaceStruct ( );
    }
}
```

Semantics
num_viewing_space indicates the number of three-dimensional viewing spaces corresponding to a media file; and
viewing_space_id indicates an identifier of the three-dimensional viewing space.

Specifically, the structure of the three-dimensional viewing space is represented by ViewingSpaceStruct ( ); the space structure is constructed by combining one or more complex geometries, and is generally obtained by combining by using a CSG (Constructive Solid Geometry) method; and the complex geometry is obtained by sequential addition and combination of basic geometries (cube, cylinder, etc.), and is generally obtained by using a CSG manner or a sequential interpolation manner.

Specifically, the basic geometry is a common shape such as a cube, a sphere, and a half-sphere. Hereinafter, illustration is made in combination with an example of basic geometry structures. Cuboidstruct( ), SpheroidStruct( ) and HalfspaceStruct( ) represent a cube, a sphere, and a half-sphere respectively.

```
aligned(8) class point( ) {
    signed int(32) center_x;
    signed int(32) center_y;
    signed int(32) center_z;
}
    aligned(8) class Cuboidstruct( ) {
    if(camera_inferred_flag==0)
        point( );
    signed int(32) size_x;
    signed int(32) size_y;
    signed int(32) size_z;
}
aligned(8) class SpheroidStruct( ) {
    if(camera_inferred _flag==0)
        point( );
    unsigned int (32) radius_x;
    unsigned int (32) radius_y;
    unsigned int (32) radius_z;
        }
    aligned(8) class HalfspaceStruct( ) {
        signed int(32) normal_x;
    signed int(32) normal_y;
    signed int(32) normal_z;
    unsigned int (32) distance;
}
```

Semantics
center_x, center_y and center_z indicate the positions of the center point of a geometry structure in a coordinate system respectively;
size_x, size_y and size_z indicate the lengths of sides of a cube in x, y and z directions respectively;
radius_x, radius_y and radius_z indicate the radiuses of a sphere in x, y and z dimensions respectively;
normal_x, normal_y and normal_z indicate planar normals defining a half-sphere respectively;
camera_inferred_flag is specified in SpaceShapeStruct( ) and indicates whether the position of a simple geometry corresponds to a collection device; being 0 indicates that the position of the simple geometry is irrelevant to the position of the collection device, and the position of the center point of the geometry needs to be defined on one's own, and being 1 indicates that the position of the simple geometry is related to the collection device, and the position information of the collection device can be used; and distance indicates the distance from an origin to a plane direction of a half-sphere along a normal vector.

In particular, the complex geometry is described by a shape space structure (ShapeSpaceStruct), and is constructed by one or more basic geometries. Hereinafter, illustration is made in combination with an example of a three-dimensional viewing space structure.

Syntax

```
aligned(8) class SpaceShapeStruct( ) {
    unsigned int( 16) num___primitive_shape;
    unsigned int(8) primitive_shape_operation;
    unsigned int(8) viewing_space_shape_type;
    unsigned int( 16) distance_scale;
    unsigned int(8) camera_inferred_flag;
    for(int i=0; i< num___primitive_shape; i++){
        if(camera_inferred_flag==1)
            unsigned int( 16) view_id;
        if(viewing_space_shape_type==0)
            Cuboidstruct( );
        else if(viewing_space_shape_type==1)
            SpheroidStruct( );
        else if(viewing_space_shape_type==2)
            HalfspaceStruct ( );
        if( guard_band_present_flag == 0)
            unsigned int( 16) guard_band_size;
    }
}
```

Semantics num_primitive_shape indicates the number of basic geometries constituting a three-dimensional viewing space;

primitive_shape_operation indicates the operation mode of the constituted three-dimensional viewing space on shapes of the basic geometries; being 0 indicates that a CSG mode is used to perform addition on the basic geometries to form a complex geometry; and being 1 indicates that an interpolation operation is performed on the basic geometries along a path formed by the centers of the basic geometries, so as to form a complex geometry;

camera_inferred_flag, being 1 indicates that the position and direction of the basic geometry correspond to a collection device, wherein the collection device corresponds to a viewpoint index number; and being 0 indicates that the position and direction of the basic geometry do not correspond to a collection device;

viewing_space_shape type indicates the shape of the basic geometry of the three-dimensional viewing space, and specific shape types are described in the following table;

| viewing_space_shape_type | Shape |
|---|---|
| 0 | Cube |
| 1 | Sphere |
| 2 | Half-sphere |
| 3 | Reserved | distance_scale indicates the scale of a frame distance size of the basic geometry; and view_id indicates an identifier of a corresponding viewpoint of a camera corresponding to the basic geometry, and by the identifier, a media track where media data corresponding to the viewpoint is located can be positioned.

Specifically, the three-dimensional viewing space structure is described by a three-dimensional viewing space structure (ViewingSpaceStruct), and is constructed by combination of one or more basic complex geometries. Hereinafter, illustration is made in combination with an example of a three-dimensional viewing space structure.

Syntax

```
aligned(8) class ViewingSpaceStruct ( ) {
    signed int (8)  num_shape_space;
    for(int j=0;j<=num_shape_space; j++) {
        signed int(8) operation_type;
        SpaceShapeStruct( );
    }
}
``` num_shape_space indicates the number of complex geometries required to compose a three-dimensional viewing space structure; and operation_type indicates a CSG operation mode in which the geometries are combined to be a three-dimensional viewing space, as shown in the following table:

| operation_type | Illustration |
|---|---|
| 0 | Addition, combination mode of geometry addition |
| 1 | Subtraction, combination mode of geometry subtraction |
| 2 | Intersection, combination mode of geometry intersection |

Figure 7:
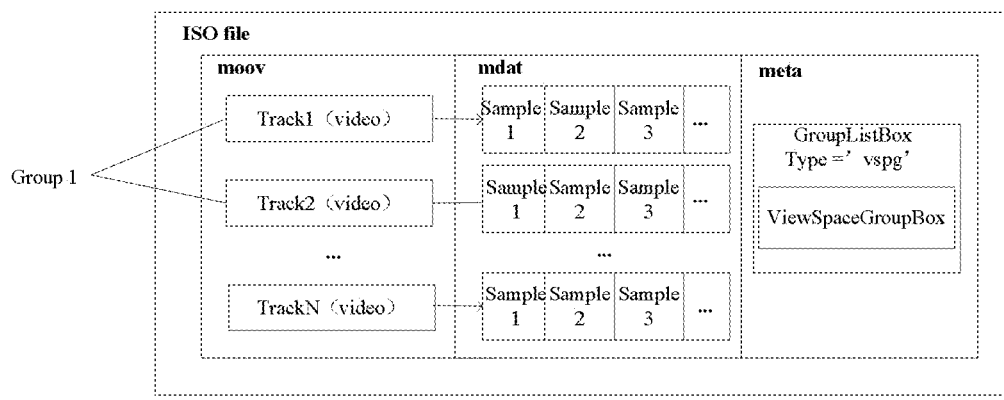
FIG. 7 is a schematic diagram of an IOS file in a method for processing immersive media data according to some embodiments of the present disclosure.

Manner 2: The three-dimensional viewing space is described at a file level, multiple media spaces may exist in one media file, and media data (such as multi-viewpoint data and point cloud data) of one or more media tracks corresponds to one three-dimensional viewing space, that is, a user may view, in the three-dimensional viewing space, visual content rendered from corresponding media data. The media tracks are grouped according to a three-dimensional viewing space, and all media tracks in the same group only belong to the same three-dimensional viewing space. A three-dimensional viewing space corresponding to a media track group is described in an entity grouping manner in ISO BMFF (as shown in FIG. 7).

Specifically, the three-dimensional viewing space is described by extending EntityToGroupBox, and is included in GroupsListBox under file-level Metabox, wherein grouping_type is 'vspg'. Hereinafter, illustration is made in combination with an example of ViewingSpaceGroupBox.

```
aligned(8) class ViewingSpaceGroupBox (version, flags)
extends EntityToGroupBox('vspg', version, flags) {
    unsigned int( 16) viewing_space_id;
    ViewingSpaceStruct ( );
}
```

Figure 8:
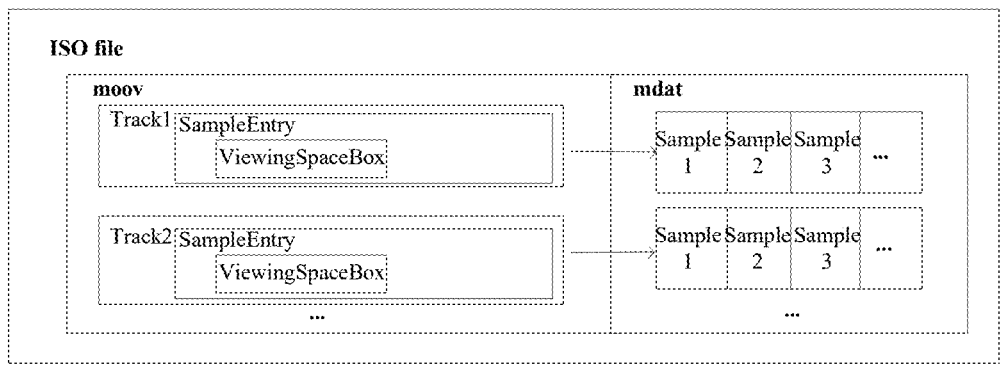
FIG. 8 is a schematic diagram of an IOS file in a method for processing immersive media data according to some embodiments of the present disclosure.

Manner 3: The three-dimensional viewing space is described at a track level, one media track may correspond to one or more three-dimensional viewing spaces, and the three-dimensional viewing spaces are described in SampleEntry (as shown in FIG. 8) of the media track. Hereinafter, illustration is made in combination with an example.

ViewingSpaceBox (Three-dimensional viewing space data box)

Box Type: 'vwsp'
Container: Sample Entry
Mandatory: No
Quantity: Zero or one
Syntax

```
aligned(8) class ViewingSpaceBox extends FullBox('vwsp', 0, flags) {
signed int (8)  num_viewing_space;
for(int j=0;j<= num_viewing_space;j++) {
    unsigned int( 16) viewing_space_id[j];
    ViewingSpaceStruct ( );
    }
}
```

Specifically, grouping of media tracks may be grouping media tracks where Atlas data is located, and information of a three-dimensional viewing space corresponding to the media tracks is described in a sample entry of the media tracks where the Atlas data is located.

Optionally, a sample entry in a corresponding media track is extended on the basis of a specific application or specific media data, for example, a volumetric video data-based media file entry is VolumetricVisualSampleEntry, which is described as an SEI message in a configuration data box (VPCCConfigurationBox).

Manner 4: The three-dimensional viewing space is described at a track level, one media track may correspond to one or more three-dimensional viewing spaces, or the structure of the three-dimensional viewing space may have a low-frequency change in a playback process, and the three-dimensional viewing space to which each sample may correspond is described by using a sample grouping manner, and one sample group corresponds to one three-dimensional viewing space, wherein grouping type is 'vssg'. Hereinafter, illustration is made in combination with an example.

```
aligned(8)    class    ViewingSpaceSmplegGroupDescriptionEntry( )    extends
SampleGroupDescriptionEntry('vssg') {
    unsigned int( 16) viewing_space_id;
    ViewingSpaceStruct ( );
}
```

Optionally, sample grouping in a corresponding media track is extended on the basis of a specific application or specific media data, for example, volumetric video data-based 'vaps'-type sample grouping, and a three-dimensional viewing space is described as an SEI message in a sample grouping entry (V3CAtlasParamSampleGroupDescriptionEntry).

Figure 9:
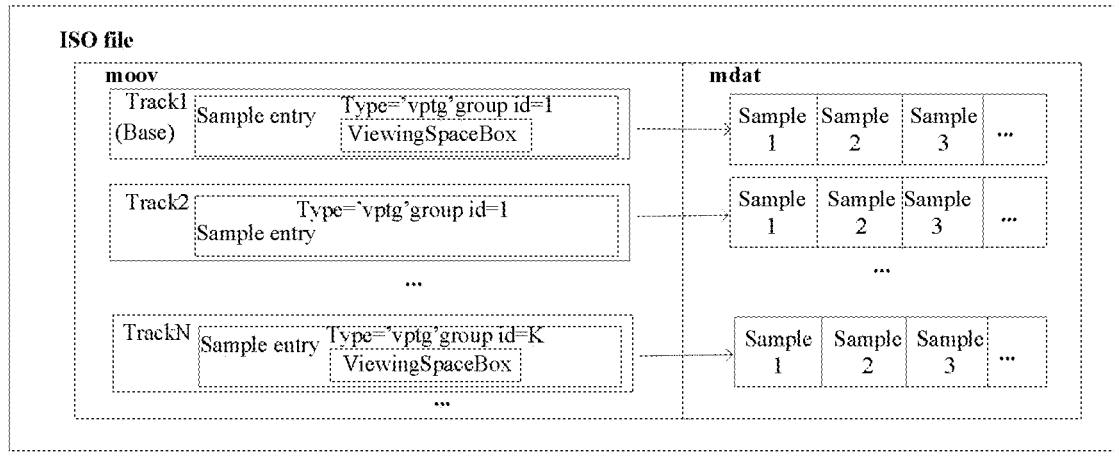
FIG. 9 is a schematic diagram of an IOS file in a method for processing immersive media data according to some embodiments of the present disclosure.

Manner 5: The three-dimensional viewing space is described at a track level, multiple media spaces may exist in one media file, and media data (such as multi-viewpoint data and point cloud data) of one or more media tracks corresponds to one three-dimensional viewing space, that is, a user may view, in the three-dimensional viewing space, visual content rendered from corresponding media data. Media tracks in a three-dimensional viewing space are grouped by defining a track group having track group type of 'vptg' (as shown in FIG. 9), and all media tracks of the same group (containing the same track_group_id) only belong to the same three-dimensional viewing space. The type typt of a group list box GroupListBox is 'vspg'.

Specifically, each group has one and has only one base track, for example, a media track containing a basic view in multi-viewpoint media data is a base track, and a three-dimensional viewing space corresponding to the media track group is described in a sample entry of the base track. Hereinafter, illustration is made in combination with an example.

ViewingSpaceBox (Three-dimensional viewing space data box)

Box Type: 'vwsp'

Container: Sample Entry

Mandatory: No

Quantity: Zero or one

Syntax

```
aligned(8) class ViewingSpaceBox extends FullBox('vwsp', 0, flags) {
unsigned int( 16) viewing_space_id;
ViewingSpaceStruct ( );
}
```

Manner 6: A media track is defined in a media file, for describing or storing various parameter information of media, and an SEI message describing a three-dimensional viewing space in a code stream layer is stored in a corresponding sample by using a sample to bear information description of an NAL unit.

Figure 10:
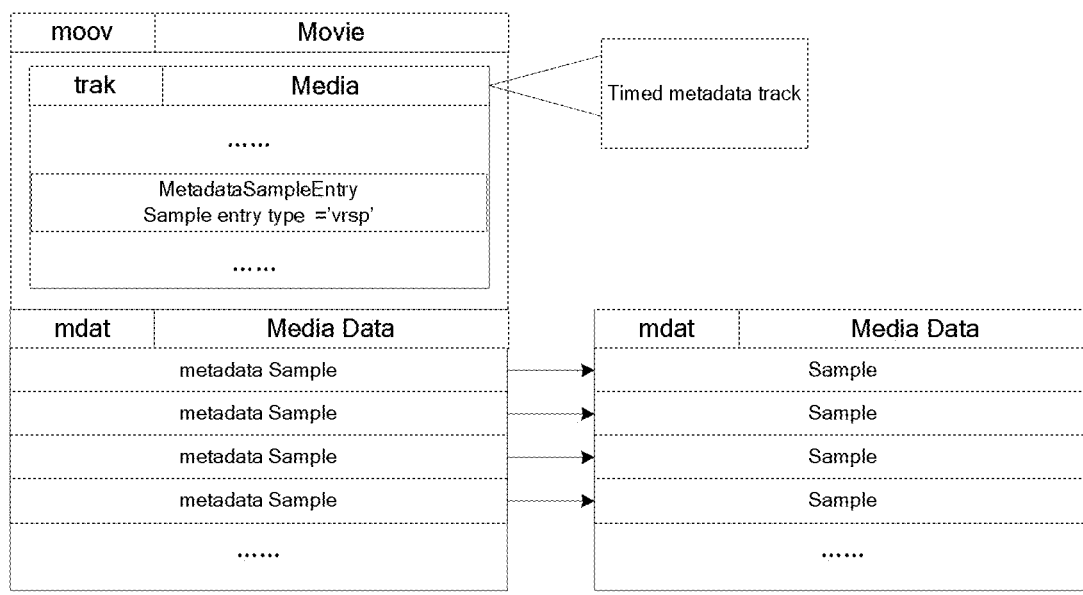
FIG. 10 is a schematic diagram of an IOS file in a method for processing immersive media data according to some embodiments of the present disclosure.

As time goes on, a three-dimensional viewing space may dynamically change due to situations such as changes in the positions of collection devices or a three-dimensional viewing space recommended by a director. The present embodiment provides a representation method based on variable three-dimensional viewing space information, as shown in FIG. 10.

Specifically, by specifying a three-dimensional viewing space in a timed metadata track, a timed metadata track sample entry (track sample entry) of the three-dimensional viewing space is identified by using a 'vrsp' type. Hereinafter, illustration is made in combination with an example of a three-dimensional viewing space structure.

Syntax

```
aligned(8) class VRSpaceSampleEntry( ) extends MetadataSampleEntry('vrsp') (
signed int(8) num_viewing space;   //optionally, one timed metadata track corresponds to
```

-continued

```
all media tracks belonging to one viewing space;
    for(int i=0;i<=num_viewing_space;i++) {
        unsigned int(8) static_vr_space_flag[i];
        unsigned int(16) viewing_space_id[i];
        if(static_vr_space_flag[i]==0)
    ViewingSpaceStruct( );
    }
}
```

Optionally, each sample corresponds to one or more three-dimensional viewing spaces, and three-dimensional viewing space information of each sample is provided by VRSpaceSample ( );

```
aligned(8) class VRSpaceSample( ) {
        signed int(8) num_viewing_space: //optionally, one timed metadata track corresponds to
all media tracks belonging to one viewing space;
    for(int j=0;i<=num_viewing_space;j++) {
        unsigned int(16) viewing_space_id[j];
        if(static_vr_space_flag[i] == 1)
    ViewingSpaceStruct( );
}
``` static_vr_space_flag, being 1 indicates that the three-dimensional viewing space is defined in a sample of the sample entry; and being 0 indicates that three-dimensional viewing spaces of all the following samples remain unchanged, and the sample entry is referred to.

num_viewing_space indicates the number of three-dimensional viewing spaces; and viewing_space_id indicates an identifier of the three-dimensional viewing space.

Optionally, if one timed metadata track can only describe the dynamic change of one three-dimensional viewing space, when a media file corresponds to multiple three-dimensional viewing spaces, there may be multiple timed metadata tracks describing the change of the multiple three-dimensional viewing spaces.

Optionally, the dynamic change of the three-dimensional viewing spaces is related to the dynamic change of collection devices, and a sample entry in a timed metadata track describing camera dynamic information (CameraInfoSampleEntry) and samples may be extended.

In addition, a dynamic-viewpoint timed metadata track may refer to a track or a track group through a track reference data box (Track Reference Box) having a reference type of 'cdsc'.

Due to the placement position and orientation of a collection device of media data in a space, a viewing problem may occur, and a viewing direction or viewing range in a three-dimensional viewing space is described by extending ViewingSpaceStruct.

Due to the placement position and orientation of a collection device of media data in a space, the directions of basic geometries of a three-dimensional viewing space corresponding to the collection device rotate in a coordinate system, for example, sides of a cube are not parallel to the coordinate axes.

Specifically, how a basic geometry rotates in the coordinate system is described by a rotation structure (ShapeRotationStruct). Hereinafter, illustration is made in combination with an example of a three-dimensional viewing space structure.

```
aligned(8) class ShapeRotationStruct( ) {
    signed int(32) shape_rotation_x;
    signed int(32) shape_rotation_y;
    signed int(32) shape_rotation_z;
}
```

Semantics shape_rotation_x, shape_rotation_y and shape_rotation_z indicate x, y and z components of rotation quaternions for a basic geometry respectively.

Alternatively, the rotation direction of the basic geometry may also be indicated by Euler angle rotation, that is, shape_rotation_x, shape_rotation_y and shape_rotation_z indicate rotation angles along x, y and z coordinate axes respectively.

Due to the problem of the placement position and orientation of a collection device of media data in a space, objects in a scene may not be collected from all angles, and when a user freely moves while viewing a video, the position range where the user can move and the viewing direction in which the user can rotate may be limited, that is, when the user moves, which causes reconstruction of visual content in the current window, the viewing direction and viewing range exceed the limit, and the visual content in the window cannot be reconstructed and rendered effectively, causing fade-out of the content, no sense of immersion, etc.

Specifically, the structure of the viewing direction or viewing range is described by a viewing direction constraint structure (ViewingDirectionConstrainStruct). Hereinafter, illustration is made in combination with an example of a three-dimensional viewing space structure based on a viewing direction and viewing range.

```
aligned(8) class ViewingDirectionConstrainStruct (camera_inferred_flag) {
    if (camera_inferred_flag == 0) {
```

```
    signed int(32)viewing_direction_center_x;
      signed int(32)viewing_direction_center_y;
      signed int(32)viewing_direction_center_z;
       }
    signed int(32) viewing_direction_yaw_range;
    signed int(32) viewing_direction_pitch_range;
    unsigned int(8) guard_band_present_flag;
        if( guard_band_present flag == 1)
    signed int(32) guard_band_direction_size;
}
```

Semantics viewing_direction_center_x, viewing_direction_center_y and viewing_direction_center_z indicate quaternion components x, y and z of the center of a recommended viewing direction in a basic geometry, respectively;

viewing_direction_yaw_range and viewing_direction_pitch_range indicate a half of a yaw range and a pitch range of the recommended viewing direction in the basic geometry, respectively;

guard_band_present_flag, being 1 indicates that the basic geometry has a guard band, and being 0 indicates that the basic geometry have no guard band; and guard_band_direction_size indicates the size of the guard band in the viewing direction in the basic geometry, and is expressed in units of degrees.

In particular, in cases where viewing direction constraint and geometry rotation are considered, SpaceShapeStruct( ) needs to be extended. Hereinafter, illustration is made in combination with an example of a three-dimensional viewing space structure.

```
           aligned(8) class SpaceShapeStruct( ) {
         unsigned int( 16) num_primitive_shape;
         unsigned int(8) primitive_shape_operation;
         unsigned int(8) viewing_space_shape_type;
          unsigned int( 16) distance_scale;
         unsigned signed int(8) camera_inferred_flag;
         for(int i=1; i< num_primitive_shape; i++){
            if(camera_inferred_flag)
              unsigned int( 16) view_id;
            if(viewing_space_shape_type==0)
              Cuboidstruct( );
            else if(viewing_space_shape_type==1)
              SpheroidStruct( );
            else if(viewing_space_shape_type==2)
              HalfspaceStruct ( );
            if( guard_band_present_flag == 0)
              unsigned int( 16) guard_band_size;
            if( primitive_orientation_present_flag)
              ShapeRotationStruct( );
            if(viewing_direction_constraint_ flag == 0)
         ViewingDirectionConstrainStruct(camera_inferred_flag);
        }
       }
```

Specifically, the three-dimensional viewing space structure is described by a three-dimensional viewing space structure (ViewingSpaceStruct), and is constructed by combination of one or more basic complex geometries. Hereinafter, illustration is made in combination with an example of a three-dimensional viewing space structure.
Syntax

```
           aligned(8) class ViewingSpaceStruct ( ) {
         signed int (8) num_shape_space;
         for(int j=0;j<=num_shape_space; j++) {
```

-continued

```
           signed int(8) operation_type;
           SpaceShapeStruct( );
         }
       }
```

With regard to a processing method of a viewer during viewing, i.e. moving into or move out of a three-dimensional viewing space, different operation types may be used based on different device types and application types, for example, a director recommends a user to perform a rendering operation of a scene when moving out of a three-dimensional viewing space. The present embodiment provides a rendering processing flow based on a three-dimensional viewing space and a representation method of a file format. The flow includes the following steps:

step S1, the viewing posture (viewing position and viewing direction) of a user changes, and a user terminal acquires a corresponding media file on the basis of a user posture change trajectory, a three-dimensional viewing space range and a handling method corresponding to the three-dimensional viewing space; and step S2, the user terminal decodes and decapsulates the acquired media file, reconstructs visual content in the current window according to information such as the current viewing posture of the user and a handling method corresponding to the three-dimensional viewing space, renders the visual content and then presents the content to the user for viewing.

Specifically, when the user's viewing posture is within the three-dimensional viewing space, it is defaulted that a corresponding media file can be directly acquired; and when the user's viewing posture is moving outside the three-dimensional viewing space or has been outside the three-dimensional viewing space, a required media file is determined and acquired according to three-dimensional viewing space handling methods corresponding to different scene requirements.

Specifically, related information of the three-dimensional viewing space handling method may be described at a file level, and may also be described at a track level. The handling method of the three-dimensional viewing space is directly related to the range of the three-dimensional viewing space, and device types, application types, or viewing handling methods supported by different three-dimensional viewing spaces may be different.

Optionally, the three-dimensional viewing space handling method is described at a file level, and the following optional manners are provided:

Manner 1: A defined three-dimensional viewing space handling box (ViewingSpaceHandlingBox) is included in Metabox of the file level, and may be included in the same data box container as a three-dimensional viewing space data box (ViewingSpaceBox).

Specifically, a handling method based on a three-dimensional viewing space is described by defining 'vsph'-type ViewingSpaceHandlingBox (three-dimensional viewing space handling data box). Hereinafter, illustration is made in combination with an example.

```
aligned(8) class ViewingSpaceHandlingBox( ) extend fullBox{
    unsigned int( 16) num_viewing_space; //optionally, if there is only one viewing space in one
    media track or a media track group, it may not be applicable.
    for(i=0; i<=num_viewing_space; i++){
       unsigned int( 16) viewing_space_id[i];
          unsigned int(8) num_handling_options;
          for (i=0; i<= num_handling_options;i++) {
             unsigned int(8) handling_device_class[i];
             unsigned int(8) handling_application_class[i];
             unsigned int(8) handling_method[i];
             }
       }
}
```

The specific syntax is as follows:
  num_viewing_space indicates the number of three-dimensional viewing spaces in a scene;
  viewing_space_id indicates an identifier of a three-dimensional viewing space to which a handling method is applicable;
  num_handling_options indicates the number of options of handling methods of a three-dimensional viewing space; being 0 indicates that no handling method for a three-dimensional viewing space is provided, and a target device may select an appropriate handling method according to three-dimensional viewing space information;
  handling_device_class indicates the value of a device class of three-dimensional viewing space handling (descriptions corresponding to specific values are shown in the following table) (all devices support 6DOF position tracking, and sometimes movement of a user is related to playback); in the same three-dimensional viewing space, one conformant bitstream should have no repeated values, and if the class value is 0, the value of i+1 should be num_handling_options;

| Value | Description |
| --- | --- |
| 0 | Match all devices |
| 1 | Support 6DOF playback head-mounted device |
| 2 | Mobile phone or tablet relying on inertial measurement unit (IMU) rendering |
| 3 | Device for free stereo playback (light field) device |
| 4 . . . 63 | Reserved | handling_application_class indicates a value of an application class of three-dimensional viewing space handling (descriptions corresponding to specific values are shown in the following table), and in the same three-dimensional viewing space, one conformant bitstream should have no repeated values, and if the class value is 0, the value of i+1 should be num_handling_options;

| Value | Description |
| --- | --- |
| 0 | Match all applications |
| 1 | Encoded immersive media is for augmented reality |
| 2 | Encoded immersive media is for virtual reality |
| 3 | Encoded immersive media is for website |
| 4 | Encoded immersive media is for one element in big screen description |
| 5 . . . 63 | Reserved | handling_method indicates a value of a three-dimensional viewing space handling method (descriptions corresponding to specific values are shown in the following table); and in the same three-dimensional viewing space, one conformant bitstream should have no repeated values, and if the class value is 0, the value of i+1 should be num_handling_options;

| Value | Description |
| --- | --- |
| 0 | Default client behavior |
| 1 | Always render when outside a three-dimensional viewing space |
| 2 | When moving outside a three-dimensional viewing space, a screen fades out and becomes a default color |
| 3 | Content inference in which inference is performed by using an abstract low-frequency method to avoid rendering distortion, but basic tone of a scene is maintained |
| 4 | When a viewer reaches the limit of a three-dimensional viewing space, reset the position and/or orientation thereof |
| 5 | A screen is rotated and translated according to a viewer, so as to prevent the viewer from reaching the limit of a three-dimensional viewing space |
| 6 | A screen rotates along with a viewer, to keep the viewer within a viewing area |
| 7 . . . 63 | Reserved |

Manner 2: Multiple media spaces may exist in one media file, and media tracks are grouped according to a three-dimensional viewing space, and all media tracks in the same group only belong to the same three-dimensional viewing space. A three-dimensional viewing space handling method corresponding to a media track group is described in an entity grouping manner in an ISO BMFF.

Specifically, the three-dimensional viewing space and the corresponding three-dimensional viewing space handling method thereof are described by extending EntityToGroup- Box, and are included in GroupsListBox under file-level Metabox, wherein grouping type is 'vspg'. Hereinafter, illustration is made in combination with an example of ViewingSpaceGroupBox.

```
aligned(8) class ViewingSpaceGroupBox (version, flags)
extends EntityToGroupBox('vspg', version, flags) {
    unsigned int( 16) viewing_space_id;
    ViewingSpaceStruct ( );
    ViewingSpaceHandlingBox( );
}
```

Optionally, the three-dimensional viewing space handling method is described at a track level, and the following optional manners are provided:

Manner 1: One media track may correspond to one or more three-dimensional viewing spaces, and information of the three-dimensional viewing space handling method is described in SampleEntry of the media track. That is, ViewingSpaceHandlingBox( ) is included in SampleEntry, and the number thereof is 0 or 1.

Manner 2: The three-dimensional viewing space is described at a track level, one media track may correspond to one or more three-dimensional viewing spaces, or the position and structure of the three-dimensional viewing space may have a low-frequency change in a playback process, and the three-dimensional viewing space to which each sample may correspond and handling method of the three-dimensional viewing space are described by using a sample grouping manner, and one sample group corresponds to one three-dimensional viewing space, wherein grouping type is 'vssg'. Hereinafter, illustration is made in combination with an example.

```
aligned(8)    class    ViewingSpaceSmplegGroupDescriptionEntry( )    extends
SampleGroupDescriptionEntry('vssg') {
    unsigned int( 16) viewing_space_id;
    ViewingSpaceStruct ( );
    ViewingSpaceHandlingBox( );
}
```

Optionally, sample grouping in a corresponding media track is extended on the basis of a specific application or specific media data, for example, volumetric video data-based 'vaps'-type sample grouping, and a three-dimensional viewing space handling method is described as an SEI message in a sample grouping entry (V3CAtlasParamSampleGroupDescriptionEntry).

Manner 3: Multiple media spaces may exist in one media file, and media data (for example, multi-viewpoint data and point cloud data) of one or more media tracks corresponds to one three-dimensional viewing space. Media tracks in a three-dimensional viewing space are grouped by defining a track group having track_group_type of 'vptg', and all media tracks of the same group (containing the same track_group_id) only belong to the same three-dimensional viewing space.

Specifically, grouping of media tracks may be grouping media tracks where Atlas data is located, and media handling method of a three-dimensional viewing space corresponding to the media tracks is described in a sample entry of the media tracks where the Atlas data is located.

Specifically, if each group has one and has only one base track, for example, a media track containing a basic view in multi-viewpoint media data is a base track, and a three-dimensional viewing space corresponding to the media track group is described in a sample entry of the base track.

Manner 4: in a media track, there may be only one media track which only stores parameter information of media, and information description of an NAL unit is carried by a sample, so that description metadata of a three-dimensional viewing space handling method may be stored as an SEI message in a corresponding sample.

When a three-dimensional viewing space constantly changes due to the change of the position of a collection device, a three-dimensional viewing space handling method may also constantly change, or may change due to situations such as director's plot arrangements, and metadata of the changing handling method of three-dimensional viewing space is described in a timed metadata track.

Specifically, the three-dimensional viewing space corresponds to the three-dimensional viewing space handling method, and then the three-dimensional viewing space handling method corresponding thereto is described in a three-dimensional viewing space timed metadata track.

Specifically, VRSpaceSampleEntry( ) and VRSpaceSample( ) thereof are extended. Hereinafter, illustration is made in combination with an example. A timed metadata track for three-dimensional viewing space handling is determined at a sample entry. One of the following methods is used for the extension of VRSpaceSampleEntry( ):

Syntax

```
aligned(8) class VRSpaceSampleEntry( ) extends MetadataSampleEntry('vrsp') {
    signed int(8) num_viewing_space; // optionally, if one timed metadata track only describes
one viewing space, it may not be used.
        for(int i=0;i<=num_viewing_space;i++) {
            unsigned int(8) static_vr_space_flag[i];
            unsigned int(8) static_space_handling_flag[i];
            unsigned int(8) handling_present[i];
            unsigned int( 16) viewing_space_id[i];
            if(static_vr_space_flag [i]==0)
                ViewingSpaceStruct( );
            if(space_handling_flag[i]==0 &&
                handling_present[i] ==1 )
        ViewingSpaceHandlingBox( );
        }
}
```

Method 2: VRSpaceSampleEntry( ) is extended to be VRSpacehandlingEntry( ), three-dimensional viewing space handling metadata is defined on the basis of a three-dimensional viewing space defined in VRSpaceSampleEntry( ) and a sample entry of a three-dimensional viewing space timed metadata track (track sample entry) is identified by means of a 'vrsh' type.

Syntax:

```
aligned(8) class VRSpacehandlingEntry( ) extends VRSpaceSampleEntry( ) ('vrsd') {
    signed int(8) num_viewing_space; // optionally, if one timed metadata track only describes one viewing space, it may not be used.
    for(int i=0;i<=num_viewing_space;i++) {
        unsigned int(8) space_handling_flag[i];
        unsigned int(8) handling_present[i];
        unsigned int( 16) viewing_space_idx[i];
        if(space_handling_flag[i]==0 && handling_present[i] ==1)
            ViewingSpaceHandlingBox( );
    }
}
```

Optionally, each sample of a timed metadata media track describes one or more three-dimensional viewing spaces, and three-dimensional viewing space handling metadata is described in each sample. One of the following methods is used for the extension of VRSpaceSample ( ):

Method 1: three-dimensional viewing space handling metadata corresponding to a three-dimensional viewing space is directly described in VRSPaceSample ( ).

Syntax:

```
aligned(8) class VRSpaceSample( ) {
    for(int j=0;j<=num_viewing_space;j++) {
        unsigned int( 16) viewing_space_id[j];
        if(static_vr_space_flag[j] == 1)
            ViewingSpaceStruct( );
            if(space_handling_flag[j]==1 &&
                handling_present[j] ==1 )
                ViewingSpaceHandlingBox( );
    }
}
```

Method 2: VRSPaceSample ( ) is extended to describe three-dimensional viewing space handling metadata corresponding to a three-dimensional viewing space.

Syntax:

```
aligned(8) class VRSampleHandling extend VRSpaceSample( ) {
    for(int j=0;j<=num_viewing_space;j++) {
        unsigned int( 16) viewing_space_idx[j];
        if(space_handling_flag[j]==1 && handling_present[j] ==1)
            ViewingSpaceHandlingBox( );
    }
}
```

Semantics space_handling_flag, being 1 indicates that the handling of a three-dimensional viewing space is defined in a sample of the sample entry; and being 0 indicates that handling methods of three-dimensional viewing spaces of all the following samples remain unchanged, and the sample entry is referred to;

viewing_space_idx indicates a viewing_space_identifier index; and handling_present, being 0 indicates that the three-dimensional viewing space uses a default handling method, and being 1 indicates a handling method corresponding to the current three-dimensional viewing space.

Optionally, if one timed metadata track can only describe the dynamic change of one three-dimensional viewing space, when a media file corresponds to multiple three-dimensional viewing spaces, there may be multiple timed metadata tracks describing the change of the multiple three-dimensional viewing spaces, and then the timed metadata of a three-dimensional viewing space corresponds to a handling method of the a three-dimensional viewing space.

Optionally, if the position and structure of a three-dimensional viewing space change, but a corresponding viewing_space_id does not change, and intrinsic parameters of a collection device corresponding to the three-dimensional viewing space do not change, then a handling method of the three-dimensional viewing space may remain unchanged. Therefore, a dynamic three-dimensional viewing space handling method may be described by using an independent timed metadata track. Hereinafter, illustration is made in combination with an example.

Syntax

```
aligned(8) class VRSpaceHandlingSampleEntry( ) extends MetadataSampleEntry('vrsh') {
    signed int(8) num_viewing_space: // optionally, if one timed metadata track only describes one viewing space, it may not be used.
    for(int i=0;i<=num_viewing_space; i++) {
        unsigned int(8) static_space_handling_flag[i];
        unsigned int( 16) viewing_space_id[i];
        if(static_space_handling_flag[i]==0 &&
            handling_ present [i]==1)
            ViewingSpaceHandlingBox( ):
    }
}
```

Optionally, each sample corresponds to a three-dimensional viewing space, and information of a three-dimensional viewing space handling method of a sample is provided by VRSpaceHandlingSample( );

```
aligned(8) class VRSpaceHandlingSample( ) {
    signed int(8) num_viewing_space; // optionally, if one timed metadata track only describes one viewing space, it may not be used.
    for(int j=0;j<=num_viewing_space; j++) {
        unsigned int( 16) viewing_space_id[j];
        unsigned int(8) handling_present[j];
        if(static_space_handling_flag[j]==1 && handling_present[j]==1)
    ViewingSpaceHandlingBox( );
    }
}
```

Figure 11:
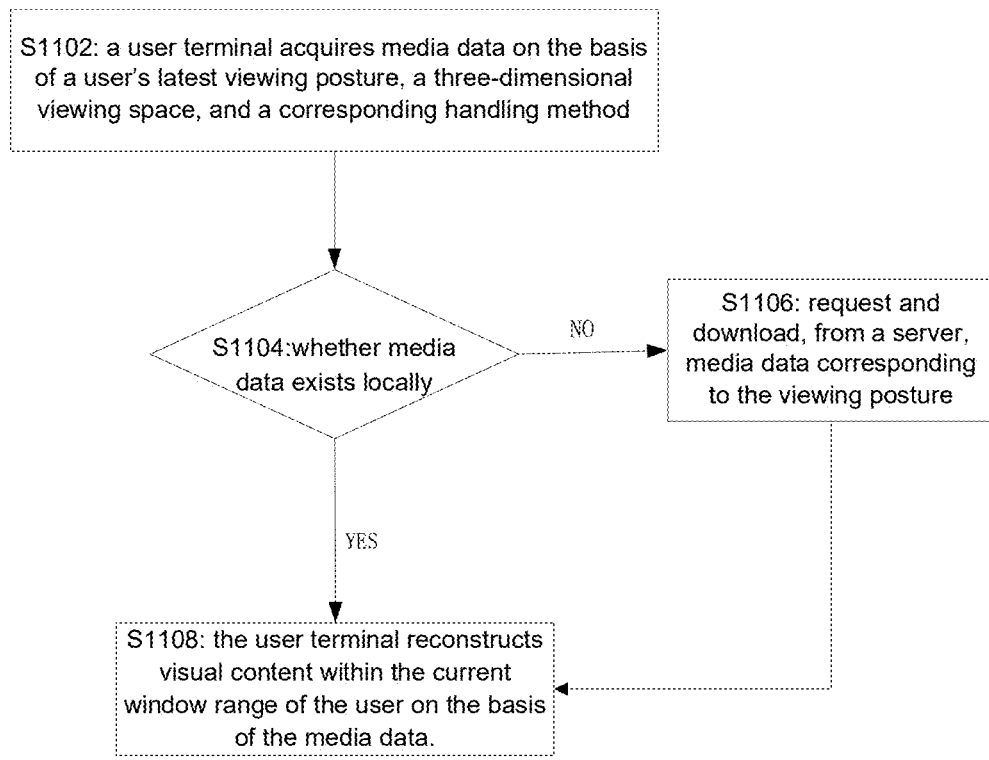
FIG. 11 is a schematic diagram of a flowchart of a method for processing immersive media data according to some embodiments of the present disclosure.

This embodiment provides a method in which a user terminal acquires media data corresponding to a user's current posture (as shown in FIG. 11). The specific steps are as follows:

S1102, a user's viewing posture (viewing position and viewing direction) changes, a user terminal determines, on the basis of a defined three-dimensional viewing space, whether a user's latest viewing posture is within the three-dimensional viewing space, is moving outside the three-dimensional viewing space, or has already been outside the three-dimensional viewing space, and determines whether corresponding media data exists locally according to the position of the user's viewing posture relative to the three-dimensional viewing space and a handling method corresponding to the three-dimensional viewing space;

S1104, it is determined whether media data corresponding to the user's current viewing posture exists locally;

S1106, if not, the position of a media file corresponding to the user's current posture is searched according to an MPD file, and corresponding media data is requested and downloaded from a server; and if so, directly go to step S1108; and S1108: if so, the user terminal reconstructs and renders visual content within the current window range of the user on the basis of the media data.

Specifically, in Media Presentation Description (MPD) of Dynamic Adaptive Streaming over HTTP (DASH), a ViewingSpace element having a scheme identifier attribute (@schemeIdUri) equal to "urn:mpeg:mpegI:miv: 2020: vwsp" is referred to as a three-dimensional viewing space (VWSP) descriptor, and corresponding media data is requested and downloaded through the descriptor.

The three-dimensional viewing space is indicated by the VWSP descriptor at an MPD layer or an Adaptation Set. The VWSP descriptor cannot occur in two levels at the same time, and if it is expressed at a lower level set, it is reused at a higher level. If the VWSP descriptor does not appear, the viewing position may not move, or the viewing position may move randomly in the space.

As shown in Table 1 below, a table describing attribute semantics of descriptor elements of a three-dimensional viewing space is provided.

TABLE 1

| Viewpoint descriptor element and attribute | Use | Description |
|---|---|---|
| vs | 0 . . . 255 | Elements and attributes containing three-dimensional viewing space information |
| vs@ViewingSpaceID | O | Indicate an identifier of a three-dimensional viewing space |
| vs.struct | 1 . . . 255 | The attributes thereof describe information of a combined three-dimensional viewing space in vs elements. |
| vs.struct@shape_operation | CM | Indicate an operation type on complex geometries combined into a three-dimensional viewing space; value 0 represents a combination mode of performing geometry addition; value 1 represents a combination mode of performing geometry subtraction; and value 2 represents a combination mode of performing geometry intersection. |
| vs.struct.primitive | 1 . . . 255 | Indicate the structures of basic geometries constituting a three-dimensional viewing space |
| vs.struct.primitive@view_id | CM | Indicate a viewpoint identifier corresponding to a basic geometric structure, and if the basic geometric structure does not correspond to any camera, there is no corresponding viewpoint. |
| vs.struct.primitive@shapetype | M | Value 0 represents that a basic geometric structure is a cube; value 1 represents that a basic geometric structure is a sphere; and value 2 represents that a base geometric structure is a half-sphere. |
| vs.struct.primitive@operation_type | CM | Value 0 represents that a CSG mode is used to perform addition on basic geometries to form a new complex geometry; and value 1 indicates that an interpolation operation is performed on the basic geometries along a path formed by the centers of the basic geometries, so as to form a new complex geometry. |
| vs.struct.primitive@center_x | O | Indicate an x-coordinate value of a basic geometric structure in a coordinate system, and if vs.struct.primitive@shape_type is 0 or 1, a default value is 0; and if |

TABLE 1-continued

| Viewpoint descriptor element and attribute | Use | Description |
| --- | --- | --- |
| | | vs.struct.primitive@shape_type is 2, this attribute is not needed |
| vs.struct.primitive @center_y | O | Indicate a y-coordinate value of a basic geometric structure in a coordinate system, and if vs.struct.primitive@shape_type is 0 or 1, a default value is 0; and if vs.struct.primitive@shape_type is 2, this attribute is not needed |
| vs.struct.primitive @center_z | O | Indicate a z-coordinate value of a basic geometric structure in a coordinate system, and if vs.struct.primitive@shape_type is 0 or 1, a default value is 0; and if vs.struct.primitive@shape_type is 2, this attribute is not needed |
| vs.struct.primitive @size_x | CM | Indicate the side length of a cube in an x-axis direction, and when vs.struct.primitive@shape_type is 0, this attribute exists |
| vs.struct.primitive @size_y | CM | Indicate the side length of a cube in a y-axis direction, and when vs.struct.primitive@shape_type is 0, this attribute exists |
| vs.struct.primitive @size_z | CM | Indicate the side length of a cube in a z-axis direction, and when vs.struct.primitive@shape_type is 0, this attribute exists |
| vs.struct.primitive @radius_x | CM | Indicate the radius length of a sphere in an x-axis direction, and when vs.struct.primitive@shape_type is 1, this attribute exists |
| vs.struct.primitive @radius_y | CM | Indicate the radius length of a sphere in a y-axis direction, and when vs.struct.primitive@shape_type is 1, this attribute exists |
| vs.struct.primitive @radius_z | CM | Indicate the radius length of a sphere in a z-axis direction, and when vs.struct.primitive@shape_type is 1, this attribute exists |
| vs.struct.primitive @normal_x | CM | Indicate a normal vector of a quaternion array of a half-sphere along an X axis, and when vs.struct.primitive@shape_type is 2, this attribute exists |
| vs.struct.primitive @normal_y | CM | Indicate a normal vector of a quaternion array of a half-sphere along a Y axis, and when vs.struct.primitive@shape_type is 2, this attribute exists |
| vs.struct.primitive @normal_z | CM | Indicate a normal vector of a quaternion array of a half-sphere along a Z axis, and when vs.struct.primitive@shape_type is 2, this attribute exists |
| vs.struct.primitive@size | CM | Indicate the distance from an origin to a planar direction of a half-sphere along a normal vector, and when vs.struct.primitive@shape_type is 2, this attribute exists |
| vs.struct.primitive @guard_band | O | Indicate the size of a guard band of a simple geometry |
| vs.struct.primitive.DirectionConstrain | O | Attributes thereof describe viewing direction constraint information of basic geometries forming a complex geometry |
| vs.struct.primitive.DirectionConstrain@ direction_center_x | O | Quaternion component x indicating the center of a recommended viewing direction in a basic geometry |
| vs.struct.primitive.DirectionConstrain@ direction_center_y | O | Quaternion component y indicating the center of a recommended viewing direction in a basic geometry |
| vs.struct.primitive.DirectionConstrain@ direction_center_z | O | Quaternion component z indicating the center of a recommended viewing direction in a basic geometry |
| vs.struct.primitive.DirectionConstrain@ direction_yaw_range | O | Indicate a half of a yaw range of a viewing direction in a basic geometry; |
| vs.struct.primitive.DirectionConstrain@ direction_pitch_range | O | Indicate a half of a pitch range of a viewing direction in a basic geometry; |
| vs.struct.primitive.rotation | O | Indicate rotation information of a basic geometry |
| vs.struct.primitive.rotation @rotation_x | O | Indicate x-component of rotation quaternion of a basic geometry |
| vs.struct.primitive.rotation @rotation_y | O | Indicate y-component of rotation quaternion of a basic geometry |
| vs.struct.primitive.rotation @rotation_z | O | Indicate z-component of rotation quaternion of a basic geometry |
| vs.struct.primitive.rotation @guard_band_direction_size | O | Indicate the size of a guard band in a viewing direction in a basic geometry, and the size is expressed in units of degrees. |

Legend:
M = Mandatory, O = Optional, and CM = Conditional Option

Optionally, for different terminal devices and applications, a three-dimensional viewing space has different handling methods for media files, and due to different handling methods, media files requiring to be selected to be acquired may be also different, for example, when a user's viewing posture changes (walking out of the three-dimensional viewing space), it is necessary to acquire a corresponding media file in a next three-dimensional viewing space. When media data corresponding to the three-dimensional viewing space is acquired, a proper media file may be selected according to three-dimensional viewing space handling information in MPD, and corresponding visual content is rendered according to a specific handling method.

Specifically, in Media Presentation Description (MPD) of Dynamic Adaptive Streaming over HTTP (DASH), a ViewingSpaceHandling element having a scheme identifier attribute (@schemeIdUri) equal to "urn:mpeg:mpegI:miv: 2020: vwph" is referred to as a three-dimensional viewing space handling method (VWPH) descriptor, and corresponding media data is requested and downloaded through the descriptor.

A corresponding three-dimensional viewing space handling method is indicated by means of a VWPH descriptor at an MPD layer or an Adaptation Set. The VWPH descriptor cannot occur in two levels at the same time, and if it is expressed at a lower level set, it is reused at a higher level.

As shown in Table 2 below, a table describing attribute semantics of descriptor elements of a three-dimensional viewing space handling method (VWPH) is provided.

TABLE 2

| Viewpoint descriptor element and attribute | Use | Description |
|---|---|---|
| Value | 1 . . . 255 | Indicate an identifier of a three-dimensional viewing space |
| Value | 1 . . . 255 | The attribute thereof describes information of a three-dimensional viewing space handling method in a vwph element |
| vwph | 1 . . . 255 | Indicate a device class of three-dimensional viewing space handling. |
| vwph@deviceclass | O | Indicate an application class of three-dimensional viewing space handling |
| vwph@ applicationclass | O | Indicate an application class of three-dimensional viewing space handling |

Legend:
M = Mandatory, O = Optional, and CM = Conditional Option

From the description of the described embodiments, a person skilled in the art would have been able to clearly understand that the method in the described embodiments may be implemented by using software and necessary general hardware platforms, and of course may also be implemented using hardware, but in many cases, the former is a better embodiment. On the basis of such understanding, the portion of the technical solution of the present disclosure that contributes in essence or to the prior art may be embodied in the form of a software product. The computer software product is stored in a storage medium (such as an ROM/RAM, a magnetic disk and an optical disc), and includes several instructions for enabling a terminal device (which may be a mobile phone, a computer, a server, or a network device, etc.) to perform the methods described in various embodiments of the present disclosure.

The present embodiment further provides an apparatus for processing immersive media data, wherein the apparatus is used to implement the foregoing embodiments and preferred embodiments, and what has been described will not be repeated again. As used below, the term "module" may implement a combination of software and/or hardware of predetermined functions. Although the apparatus described in the following embodiments is preferably implemented in software, implementation in hardware or a combination of software and hardware is also possible and could have been conceived.

Figure 12:
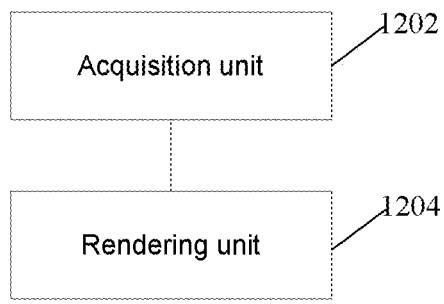
FIG. 12 is a schematic structural diagram of an apparatus for processing immersive media data according to some embodiments of the present disclosure.

FIG. 12 is a structural block diagram of an apparatus for processing immersive media data according to some embodiments of the present disclosure. As shown in FIG. 12, the apparatus includes:

an acquisition unit 1202, configured to acquire immersive media data corresponding to a current viewing posture of a user, wherein a three-dimensional viewing space is used to limit viewing content of the user; and a rendering unit 1204, configured to render the immersive media data corresponding to the current viewing posture, wherein when the current viewing posture is within the three-dimensional viewing space, the acquired immersive media data is rendered; or when the current viewing posture has moved or is moving outside the three-dimensional viewing space, the immersive media data is rendered according to handling information of the three-dimensional viewing space.

It should be noted that the modules above may be implemented by software or hardware, and the latter may be implemented in the following manner, but is not limited thereto: all the modules above are located in the same processor; or all the modules above are located in different processors in any arbitrary combination manner.

Embodiments of the present disclosure further provide a computer-readable storage medium, the computer-readable storage medium storing a computer program, wherein the computer program is configured to execute the steps in any one of the method embodiments when running.

In some exemplary embodiments, the computer-readable storage medium may include, but is not limited to: any medium that can store a computer program, such as a USB flash drive, a Read-Only Memory (ROM for short), a Random Access Memory (RAM for short), a removable hard disk, a magnetic disk, or an optical disc.

Embodiments of the present disclosure further provide an electronic apparatus, including a memory and a processor, wherein the memory stores a computer program, and the processor is configured to run the computer program, so as to execute the steps in any one of the method embodiments.

In some exemplary embodiments, the electronic apparatus can further include a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

It is apparent that a person skilled in the art shall understand that all of the described modules or steps in the present disclosure may be implemented by using a general computation apparatus, may be centralized on a single computation apparatus or may be distributed on a network composed of multiple computation apparatuses, and may be implemented by using executable program codes of the computation apparatus. Thus, the described modules or steps may be stored in a storage apparatus and executed by the computation apparatus. In some cases, the shown or described steps may be executed in a sequence different from that shown herein, or they are manufactured into integrated circuit modules, or multiple modules or steps therein are manufactured into a single integrated circuit module. Thus, the present disclosure is not limited to any specific hardware and software combinations.

The content above only relates to preferred embodiments of the present disclosure, and is not intended to limit the present disclosure. For a person skilled in the art, the present disclosure may have various modifications and changes. Any modifications, equivalent replacements, improvements, etc. made within the principle of the present disclosure shall all fall within the scope of protection of the present disclosure.

What is claimed is:

1. A method for processing immersive media data, comprising:
    acquiring immersive media data corresponding to a current viewing posture of a user, wherein a three-dimensional viewing space is used to limit viewing content of the user; and
    rendering the immersive media data corresponding to the current viewing posture, wherein when the current viewing posture has moved or is moving outside the three-dimensional viewing space, the immersive media data is rendered according to handling information of the three-dimensional viewing space;
    wherein acquiring immersive media data corresponding to a current viewing posture of a user comprises:
    in a case where it is determined that the current viewing posture of the user is moving or has moved outside the three-dimensional viewing space, acquiring the immersive media data corresponding to the current viewing posture according to the handling information of the three-dimensional viewing space;
    wherein acquiring the immersive media data comprises:
    determining a media presentation description file, wherein the media presentation description file comprises a three-dimensional viewing space descriptor and/or a three-dimensional viewing space handling descriptor which indicate viewing of the immersive media; and
    according to the three-dimensional viewing space descriptor and/or the three-dimensional viewing space handling descriptor which correspond to the current viewing posture of the user, requesting to acquire the immersive media data corresponding to the current viewing posture.

2. The method according to claim 1, wherein acquiring immersive media data corresponding to a current viewing posture comprises:
    determining a relationship between the current viewing posture and the three-dimensional viewing space, wherein the three-dimensional viewing space is a range allowing the user to move in an immersive media scene; and
    determining the immersive media data according to the relationship.

3. The method according to claim 2, wherein determining a relationship between the current viewing posture and the three-dimensional viewing space comprises:
    determining a position of the current viewing posture in the three-dimensional viewing space or outside the three-dimensional viewing space; and
    determining the three-dimensional viewing space of the immersive media data according to the position.

4. The method according to claim 1, wherein before rendering the immersive media data corresponding to the current viewing posture, the method comprises:
    according to a data box type or a timed metadata track sample entry type, determining a media track or a data box, which describes the handling information of the three-dimensional viewing space, in a media file.

5. The method according to claim 4, wherein according to a data box type or a timed metadata track sample entry type, determining a timed metadata track or a data box, which describes the three-dimensional viewing space, in a media file comprises one of the following methods:
    identifying a first three-dimensional viewing space data box in a file header of the media file according to a first data box type; or
    identifying a second three-dimensional viewing space grouping data box in the file header of the media file according to a second grouping type; or
    identifying a third three-dimensional viewing space data box in one or more media tracks of the media file according to a third data box type; or
    identifying a fourth three-dimensional viewing space sample group description data box in a media track of the media file according to a fourth sample grouping type; or
    identifying a fifth three-dimensional viewing space data box in one media track of the media file according to a fifth track group type, wherein one or more media tracks having the same track group identifier belong to the same three-dimensional viewing space; or
    identifying a three-dimensional viewing space timed metadata track in the media file according to a sixth sample entry type, wherein the three-dimensional viewing space timed metadata track indicates a dynamically-changing three-dimensional viewing space of the immersive media data.

6. The method according to claim 1, wherein information of the three-dimensional viewing space comprises at least one of:
    coordinate positions of the three-dimensional viewing space in a space scene of immersive media, an orientation of the three-dimensional viewing space in the space scene of the immersive media, a geometric structure of the three-dimensional viewing space, and a viewing direction in the three-dimensional viewing space, wherein the structure of the three-dimensional viewing space is constructed by combining one or more complex geometric structures, each of the complex geometric structures is constructed by combining one or more basic structures; and each of the basic structures corresponds to a collection device or a collected view of zero or one piece of the immersive media data.

7. The method according to claim 1, wherein before rendering the immersive media data corresponding to the current viewing posture, the method comprises:
    according to a data box type or a timed metadata track sample entry type, determining a timed metadata track or a data box, which describes the handling information of the three-dimensional viewing space, in a media file.

8. The method according to claim 7, wherein according to a data box type or a timed metadata track sample entry type, determining a timed metadata track or a data box, which describes the handling information of the three-dimensional viewing space, in a media file comprises:
    identifying a three-dimensional viewing space handling data box by a seventh data box type, wherein the three-dimensional viewing space handling data box is included in the data box describing the three-dimensional viewing space, or is located in the same higher-level data box as the data box describing the three-dimensional viewing space; or the three-dimensional viewing space handling data box is included in a timed metadata track of the three-dimensional viewing space; or identifying a three-dimensional viewing space handling timed metadata track in the media file according to an eighth sample entry type, wherein the three-dimensional viewing space handling timed metadata track indicates a handling method of a dynamically-changing three-dimensional viewing space in the three-dimensional viewing space.

9. The method according to claim 8, wherein the handling information of the three-dimensional viewing space comprises at least one of:

the number of options of handling methods of the three-dimensional viewing space, the type of devices for handling the three-dimensional viewing space, the type of applications for handling the three-dimensional viewing space, handling methods of the three-dimensional viewing space and an identifier of the three-dimensional viewing space.

10. The method according to claim 1, wherein the three-dimensional viewing space descriptor of the immersive media comprises at least one of:

the structure of a basic geometry, a rotation direction of the basic geometry, a view corresponding to the basic geometry or an identifier or index of a collection device, rotation of the basic geometry, a viewing direction in the basic geometry, a combination manner of basic geometries, a combination manner of complex geometries, and an identifier of the three-dimensional viewing space.

11. The method according to claim 1, wherein the three-dimensional viewing space handling descriptor of the immersive media comprises at least one of:

the type of devices for handling the three-dimensional viewing space, the type of applications for handling the three-dimensional viewing space, handling methods of the three-dimensional viewing space and an identifier of the three-dimensional viewing space.

12. An apparatus for processing immersive media data, comprising:

an acquisition unit, configured to acquire immersive media data corresponding to a current viewing posture of a user, wherein a three-dimensional viewing space is used to limit viewing content of the user; and a rendering unit, configured to render the immersive media data corresponding to the current viewing posture, wherein when the current viewing posture has moved or is moving outside the three-dimensional viewing space, the immersive media data is rendered according to handling information of the three-dimensional viewing space;

wherein the acquisition unit is further configured to: in a case where it is determined that the current viewing posture of the user is moving or has moved outside the three-dimensional viewing space, acquire the immersive media data corresponding to the current viewing posture according to the handling information of the three-dimensional viewing space;

wherein the acquisition unit is further configured to:

determine a media presentation description file, wherein the media presentation description file comprises a three-dimensional viewing space descriptor and/or a three-dimensional viewing space handling descriptor which indicate viewing of the immersive media; and according to the three-dimensional viewing space descriptor and/or the three-dimensional viewing space handling descriptor which correspond to the current viewing posture of the user, request to acquire the immersive media data corresponding to the current viewing posture.

13. A non-transitory computer-readable storage medium, the computer-readable storage medium storing a computer program, wherein the computer program is configured to execute the method according to claim 1 when running.

14. An electronic apparatus, comprising a memory and a processor, wherein the memory stores a computer program, and the processor is configured to run the computer program so as to execute the method according to claim 1.

15. The method according to claim 1, wherein the three-dimensional viewing space descriptor of the immersive media comprises at least one of:

the structure of a basic geometry, a rotation direction of the basic geometry, a view corresponding to the basic geometry or an identifier or index of a collection device, rotation of the basic geometry, a viewing direction in the basic geometry, a combination manner of basic geometries, a combination manner of complex geometries, and an identifier of the three-dimensional viewing space.

16. The method according to claim 1, wherein the three-dimensional viewing space handling descriptor of the immersive media comprises at least one of:

the type of devices for handling the three-dimensional viewing space, the type of applications for handling the three-dimensional viewing space, handling methods of the three-dimensional viewing space and an identifier of the three-dimensional viewing space.

17. An electronic apparatus, comprising a memory and a processor, wherein the memory stores a computer program, and the processor is configured to run the computer program so as to execute the method according to claim 2.

18. An electronic apparatus, comprising a memory and a processor, wherein the memory stores a computer program, and the processor is configured to run the computer program so as to execute the method according to claim 3.

* * * * *